(12) United States Patent
Duff

(10) Patent No.: US 7,607,364 B2
(45) Date of Patent: Oct. 27, 2009

(54) METHOD AND APPARATUS FOR SIMPLIFIED AND HYGIENIC ACCESS TO A FLUID CHAMBER

(76) Inventor: Alan John Duff, Yesterwood, 6, Windmill Park, Wrotham Health, Sevenoaks, Kent (GB) TN 15 7SY ( * ) Notice: Subject to any disclaimer, the term of this patent is extended or adjusted under 35 U.S.C. 154(b) by 249 days.

(21) Appl. No.: 11/538,117

(22) Filed: Oct. 3, 2006

(65) Prior Publication Data

US 2008/0078259 A1 Apr. 3, 2008

(51) Int. Cl.
*G01D 21/00* (2006.01)
(52) U.S. Cl. .................................. 73/866.5
(58) Field of Classification Search ............... 73/866.5, 73/863.85, 86, 756; 374/208, 148
See application file for complete search history.

(56) References Cited

U.S. PATENT DOCUMENTS

| | | | | |
|---|---|---|---|---|
| 2,515,948 | A * | 7/1950 | Cyr | 138/45 |
| 2,966,133 | A * | 12/1960 | Hube | 340/610 |
| 3,361,944 | A * | 1/1968 | Reinhart | 361/280 |
| 3,863,937 | A * | 2/1975 | Silverman et al. | 277/626 |
| 4,267,401 | A * | 5/1981 | Wilkinson | 174/77 R |
| 4,411,458 | A | 10/1983 | Strunk et al. | 285/196 |
| 4,550,590 | A | 11/1985 | Kesson | 73/19.05 |
| 4,645,242 | A | 2/1987 | Coleman et al. | 285/141.1 |
| 4,717,159 | A | 1/1988 | Alston et al. | 277/314 |
| 4,746,127 | A | 5/1988 | Westhoff et al. | 277/314 |
| 4,836,558 | A | 6/1989 | Anderson et al. | 277/314 |
| 5,299,594 | A * | 4/1994 | Lord et al. | 137/101.19 |
| 5,421,997 | A | 6/1995 | Gerteis | 210/90 |
| 5,737,822 | A | 4/1998 | Driver et al. | 29/50 |
| 6,193,409 | B1 | 2/2001 | Brunson et al. | 366/331 |

(Continued)

FOREIGN PATENT DOCUMENTS

| | | |
|---|---|---|
| DE | 10047758 | 5/2001 |
| DE | 202005013904 | 3/2006 |
| WO | WO 9705459 A1 * | 2/1997 |

OTHER PUBLICATIONS

International Search Report, International Application No. PCT/GB2007/002711, Mailed: Oct. 19, 2007.

*Primary Examiner*—Hezron Williams
*Assistant Examiner*—Tamiko D Bellamy
(74) *Attorney, Agent, or Firm*—Coats & Bennett, P.L.L.C.

(57) ABSTRACT

A hygienic insert connector assembly that prevents biological contamination under sanitary processing conditions. It comprises an insert adapted to pass through an opening into a fluid chamber, a support assembly to support the insert, a seal disposed around the insert to seal the opening into the fluid chamber, and a compression mechanism to compress the seal. When the seal is axially compressed, the seal radially expands and contacts the wall of the opening into the fluid chamber as well as compressing the seal against the insert to form fluid tight seals. This eliminates the potential for product entrapment within or around the sealed surfaces, allowing efficient in-place cleaning and sterilization procedures as well as minimizing product wastage on process startup and shutdown. The connector assembly is also designed such that positive pressure inside the fluid chamber enhances the seals that are formed, and can be used with (but is not limited to) small diameter or high surface curvature fluid chambers and without limitation on the orientation of the chamber. The simple design and sealing method enables the insert to be easily removed, examined and re-inserted in conformance with international design standards for sanitary equipment.

20 Claims, 3 Drawing Sheets

U.S. PATENT DOCUMENTS

| | | | |
|---|---|---|---|
| 6,467,815 B1 | 10/2002 | Rich et al. | 285/208 |
| 6,581,938 B2 | 6/2003 | McKenrick | 277/314 |
| 6,773,678 B2 | 8/2004 | Cummings et al. | 422/104 |
| 2005/0264302 A1* | 12/2005 | Mohajer et al. | 324/639 |
| 2005/0275557 A1 | 12/2005 | Newberg | 340/686.4 |

* cited by examiner

METHOD AND APPARATUS FOR SIMPLIFIED AND HYGIENIC ACCESS TO A FLUID CHAMBER

FIELD OF THE INVENTION

The present invention relates to devices for permitting simplified and hygienic access to the interior of fluid chambers.

BACKGROUND

Operations involving the handling and processing of fluids entail fluids being contained in various types of fluid chambers. These fluid chambers may take the form of pipes, conduits, tubes, or open channels for transporting fluids under the influence of gravity or of pumping systems, or they may take the form of vessels, tanks, or vats for carrying out various chemical or other processes. Monitoring process variables within a fluid chamber is a key component of overall process assessment and control, and such assessment and control may require injection and/or extraction of materials to or from the chamber. While access ports for measurement and control may be designed within a fluid chamber initially, such is not always the case. In some cases, process conditions and other considerations may warrant placement of access ports at different places and for different purposes than those provided in the initial fabrication of a chamber.

There are numerous challenges to designing access devices for fluid chambers, particularly for industries processing food, drinks, pharmaceuticals, and bio-products, etc. First, access devices should be designed to maintain hygienic conditions in the area where the access device penetrates the fluid chamber. Maintenance of hygienic conditions is promoted by not having crevices or voids where process products may collect and stagnate creating biological risks. Second, in many cases the fluid contained within the chamber will be at a substantial pressure. Accordingly, the access device should be robust and designed such that it and the seal provided can be securely held in place without being adversely affected hygienically by the pressure within the chamber.

There are known devices that are designed for gaining access to fluid chambers used for processing/conveying fluids under hygienic requirements. Most of the devices are provided with an elastomeric seal for forming a sealed relationship between the access device and the edge of an opening in the fluid chamber. The design of these access devices is generally that, when installed, the seal lies between the wall of the chamber and a support structure secured to the chamber. When the access device is installed, the support structure compresses the seal axially against the surface of the chamber.

The geometry of the access device in the vicinity of the chamber opening where the seal is located often introduces localized zones of fluid stagnation within the chamber. These zones can have a negative hygienic impact on the fluid contained within the chamber since they cannot be effectively cleaned in situ by routine Clean-In-Place (CIP) procedures. This results in the need to dismantle the support structure and access device in order to carry out manual cleaning procedures on the dismantled components at frequent intervals. These procedures are both labor intensive and time consuming.

Another disadvantage of this kind of access device installation geometry is the restriction it places on the choice of installation location within the process.

A further problem encountered by the known forms of access device is that an increase in the fluid pressure within the chamber will have a tendency to move the support structure that compresses the seal away from the seal and the chamber opening resulting in a reduction in the compression of the seal. This produces an increased hygienic risk from fluid ingress into the seal contact areas.

SUMMARY

The present invention is a device, referred to as a connector assembly, which permits easy access to a fluid chamber and forms a generally fluid tight and hygienic seal between the device and the edge of an opening in the chamber. The device includes an insert that projects through the opening in the chamber. A seal is disposed around the insert and between spaced-apart compression members. At least one of the compression members is movable with respect to the other for compressing the seal. The seal extends beyond the opening such that a portion of the seal is disposed within the fluid chamber. When the device is installed, the insert and seal are positioned such that the seal lies in the opening of the chamber. Compression of the seal causes the seal to radially expand and form a fluid tight seal between the seal and the inside edge of the opening into the chamber.

The present invention also provides a method of gaining access to a fluid chamber through an opening in the chamber. This method includes providing access to the fluid chamber by projecting an insert, having an access opening therein, through the opening in the fluid chamber. A seal extends around the insert and is positioned such that the seal projects axially from opposite sides of the opening. The method includes sealing a space between the insert and an edge of the opening by axially compressing the seal and causing the seal to be forced radially against the edge of the opening.

Other objects and advantages of the present invention will become apparent and obvious from a study of the following description and the accompanying drawings which are merely illustrative of such invention

DETAILED DESCRIPTION OF EXEMPLARY EMBODIMENTS

Figure 1:
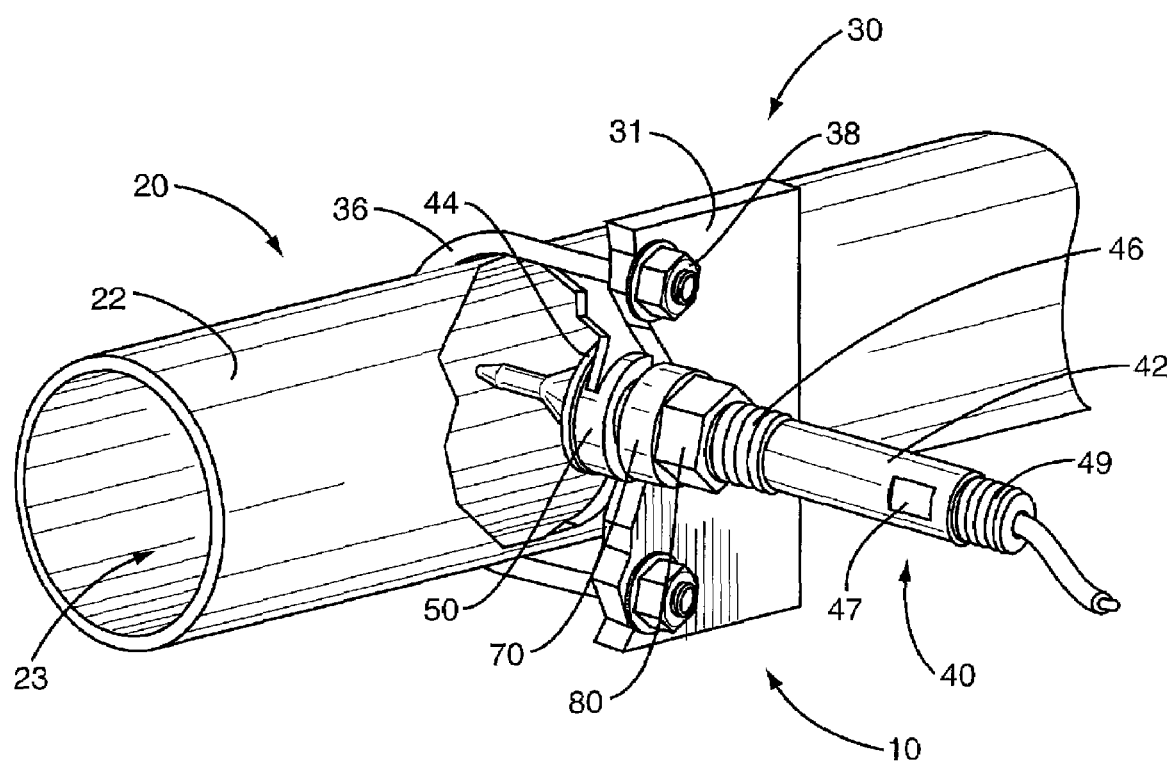
FIG. 1 is a perspective view of the connector assembly installed on a pipe.
Figure 2:
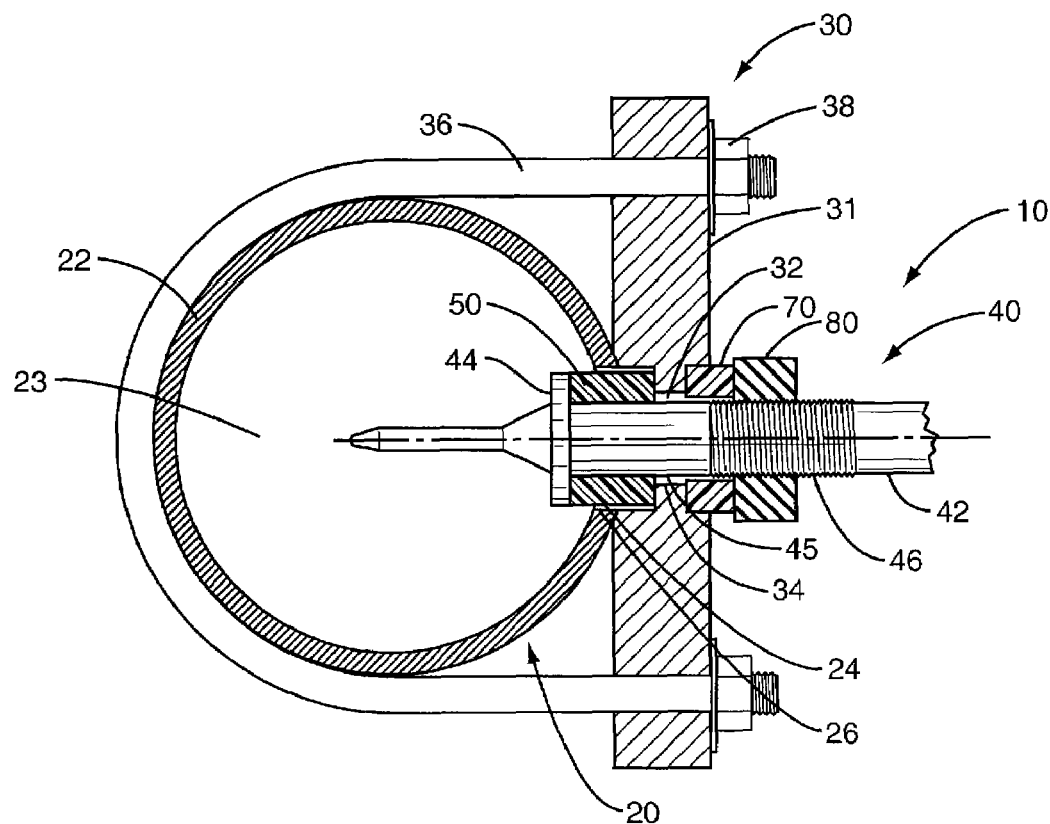
FIG. 2 is a sectional view of the connector assembly showing the seal thereof in an uncompressed state.
Figure 3:
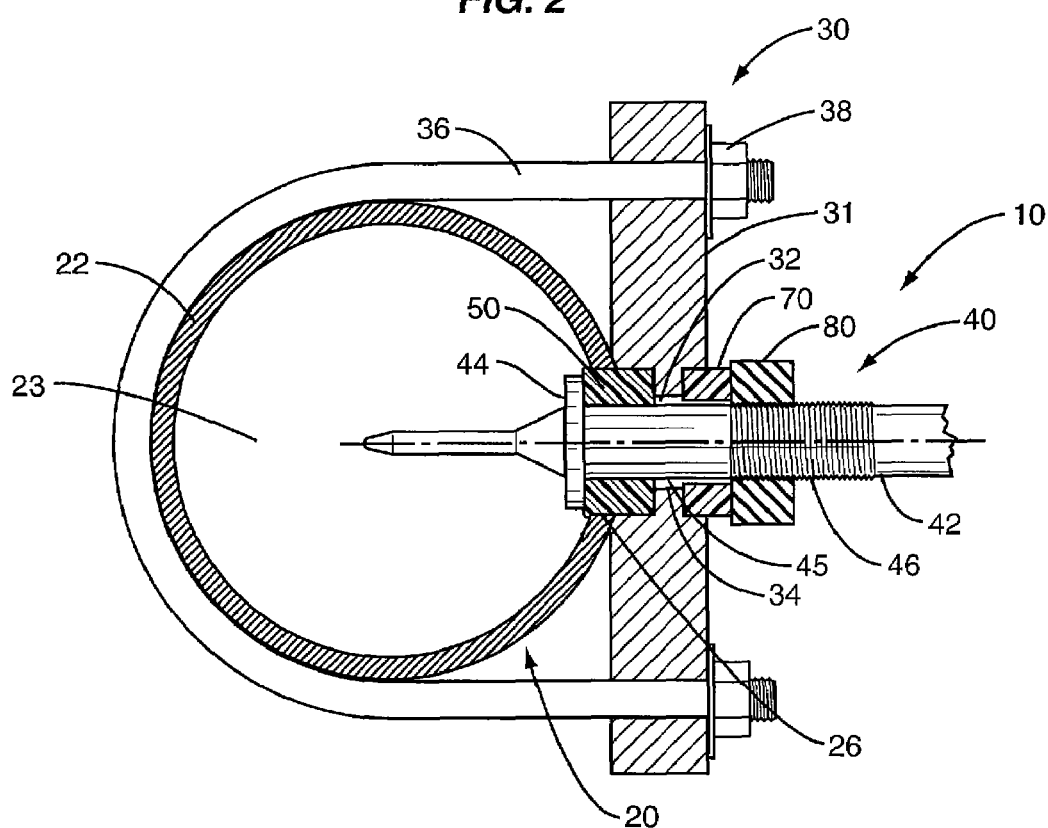
FIG. 3 is a sectional view of the connector assembly showing the seal thereof in a compressed state.

With reference to the drawings, the present invention is a connector assembly, indicated generally by the numeral 10, that provides access to a fluid chamber 20 having a chamber wall 22. FIGS. 1-3 illustrate a first embodiment of the connector assembly 10. The connector assembly 10 comprises an insert 40 adapted to pass through an opening 24 into the fluid chamber 20, a support assembly 30 to support the insert 40, a seal 50 disposed around an outer surface 45 of the insert 40 to seal the opening 24 into the fluid chamber 20, and a compression mechanism to compress the seal 50. When the seal 50 is compressed, the seal 50 radially expands and contacts the inside edge 26 of the opening 24 into the fluid chamber 20 to form a fluid tight seal. The connector assembly 10 is designed so that positive pressure inside the fluid chamber 20 enhances the seal that is formed. Additionally, the connector assembly 10 is designed to minimize biological contamination risks and the transfer of thermal or electrical energy from the wall 22 to the insert 40.

The support assembly 30 comprises a support member 31, one or more U-bolts 36, and mounting nuts 38. Support member 31 has an opening 32 through which the insert 40 can be assembled via the proximal end of the insert. Mounting holes to accept the ends of U-bolts 36 are disposed on opposite sides of the opening 32. Support member 31 is positioned adjacent to fluid chamber 20 such that throughway opening 32 aligns with opening 24 in the chamber. The surface of the support member 31 facing the fluid chamber 20 may be contoured or machined so that it conforms to the shape of the fluid chamber 20 and provides a surface-to-surface contact. The support member 31 is affixed and anchored to the fluid chamber 20 with the U-bolt 36 and pair of mounting nuts 38. If desired, more than one U-bolt 36 or other form of clamping device can be used.

The insert 40 may comprise a measurement probe, thermowell, or sleeve, or similar structure that extends into the fluid chamber 20. Insert 40 has a generally cylindrical body 42 with a flange 44 at the distal end. A portion of the outer surface 45 includes threads 46. Wrench flats 47 on the body 42 facilitate gripping the insert and preventing it from turning during installation or removal as hereinafter described. The proximal end of the insert 40 may have external threads 49 to provide a means of connecting an electrical housing or other conduit (not shown)

Disposed on insert 40 is a compressible seal 50. Seal 50 has a generally annular shape with a central opening sized such that the seal 50 fits snugly around the insert 40. As seen in the drawings, when the connector assembly 10 is secured to the chamber 20, the insert 40 is positioned such that the seal 50 is disposed within the opening 24 in the fluid chamber 20 and such that a portion of the seal 50 extends into the interior 23 of the fluid chamber 20. As described below, the seal 50 radially expands when compressed to form a fluid-tight seal with the inside edge 26 of the opening 24. A portion of the seal 50 contacts the inside edge 26 of the opening. The portion of the seal 50 extending into the fluid chamber 20 expands beyond the inside edge 26. The diameter of the portion of the compressed seal 50 extending into the fluid chamber 20 is greater than the diameter of the opening 24. The profile of the opening 24 and seal 50 are shown as circular in shape, although other geometries are possible.

The compression mechanism for compressing the seal 50 comprises first and second compression members disposed on opposite sides of seal 50 and an actuator 80 to squeeze the seal 50 between the compression members. At least one of these compression members is movable with respect to the insert 40 for engaging and compressing the seal 50. In the embodiment illustrated in FIGS. 1-3, the flange 44 on the insert 40 functions as the first compression member. A shoulder 34 within the opening 32 of the support member 31 functions as the second compression member. The actuator 80 comprises a threaded nut 80 that engages with the external threaded portion 46 of the insert 40. A bushing 70 may be inserted between the actuator 80 and the support member 31 to provide electrical and/or thermal isolation for the insert 40 when made from non-conductive material. The actuator 80 is rotated in a direction such that the bushing 70 is driven into contact with the support member 31. Further rotation of actuator 80 retracts insert 40 and compresses seal 50 between the flange 44 and the shoulder 34 in the support member 31. Threaded portion 46 ends at a point along insert 40 such that it is not possible to over-compress the seal 50.

Figure 4:
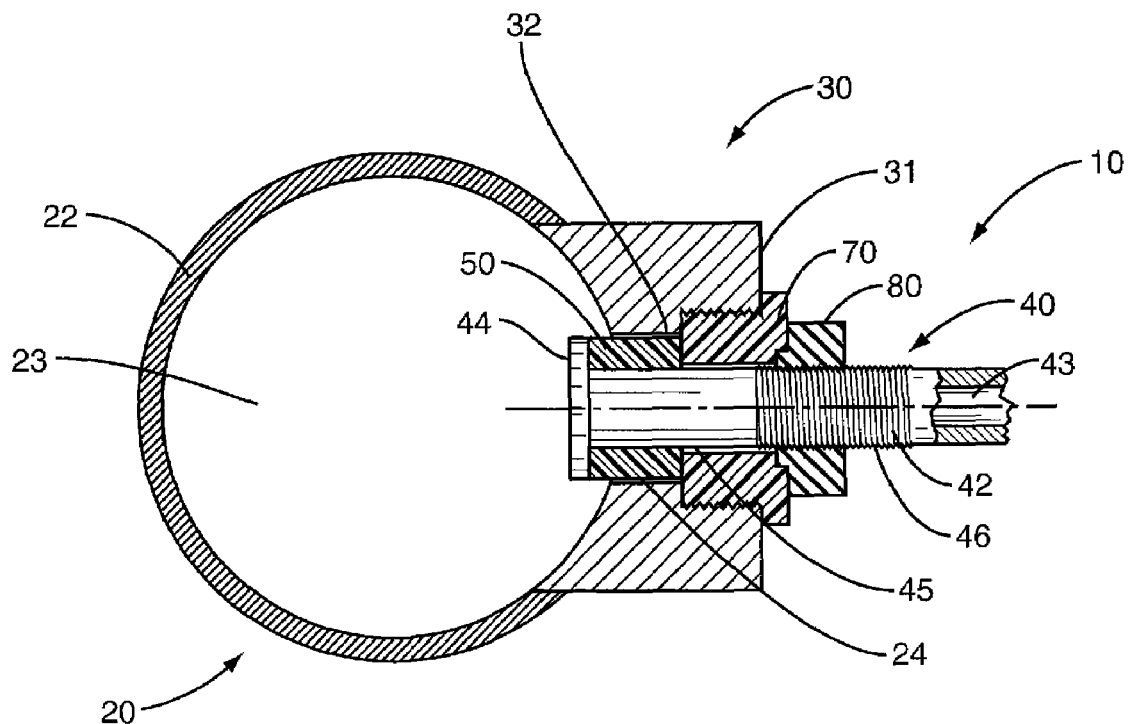
FIG. 4 is a sectional view of an alternate embodiment of the connector assembly showing the seal thereof in an uncompressed state.
Figure 5:
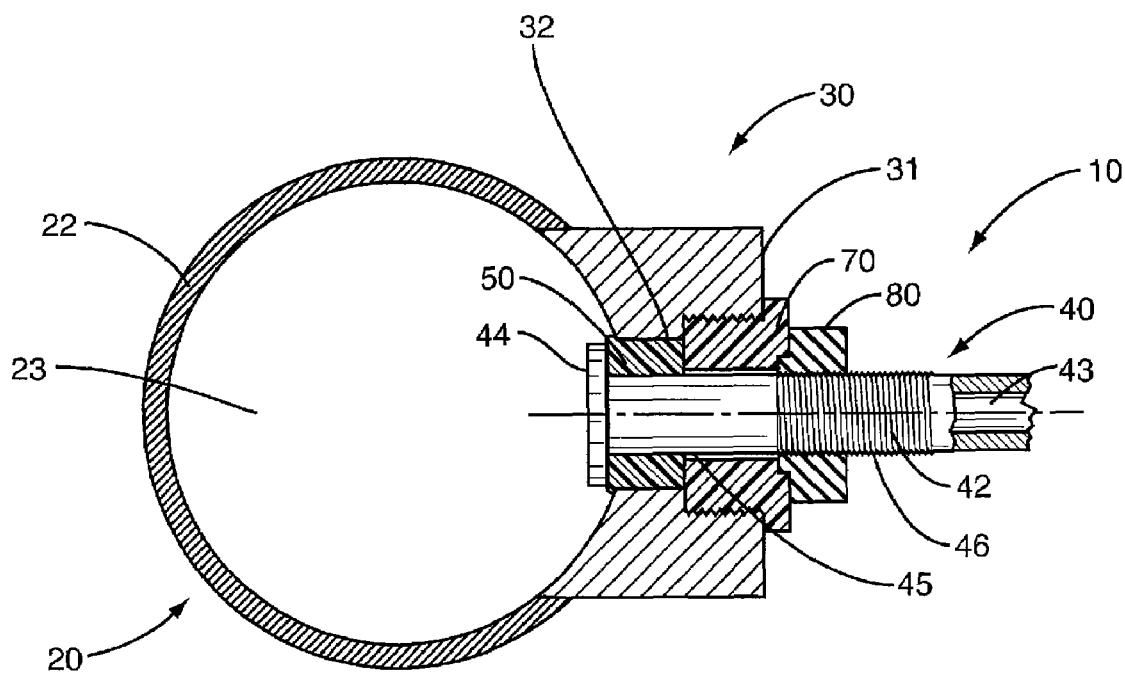
FIG. 5 is a sectional view of an alternate embodiment of the connector assembly showing the seal thereof in a compressed state.

FIGS. 4-5 illustrate a second embodiment that is similar in most respects to the first embodiment. For clarity, the reference numbers used to denote components of the second embodiment are the same as the first embodiment where the components are similar. Detailed description of components previously described are omitted. For brevity, the second embodiment is described below by highlighting the differences from the first embodiment.

An object of the second embodiment is to allow the insert 40 to be installed and removed without dismantling the support member 31 from the chamber. The insert 40 in this embodiment comprises a sleeve with an axial opening 43 providing access to the interior of the fluid chamber 20. The throughway opening 32 in the support member 31 is enlarged enough to allow passage of the insert 40. The support member 31 in this embodiment comprises a mounting block that is integrally formed with the fluid chamber 20, or is permanently affixed to the fluid chamber 20, such as by welding. Those skilled in the art will appreciate that a removable support member 31, as shown in FIGS. 2 and 3, could also be used.

In the second embodiment, the bushing 70 is designed to engage the seal 50, and function as the second compression member. Bushing 70 includes threads which engage mating threads in the support member 31. The bushing 70 is tightened to prevent the bushing 70 from moving axially relative to the support member 31. Seal 50 is thus positioned directly between flange 44 and bushing 70. The bushing 70 can also provide electrical and/or thermal isolation for the insert 40 when made from a non-conductive material.

The second embodiment functions in substantially the same manner as the first embodiment. The actuator 80 comprises a nut that is tightened to compress the seal 50 as shown in FIG. 5. When the seal 50 is compressed, it expands radially into contact with the inside edge 26 of the opening 24 into the fluid chamber 20.

To remove insert 40, actuator 80 is rotated to release the pressure on the seal 50. Due to the natural resiliency of the material, the seal 50 will contract so that the insert 40 and seal 50 can be withdrawn from the fluid chamber 20.

Various materials may be used to manufacture the connector assembly 10 of the present invention. However, in some applications it may be desirable to isolate components of the connector assembly 10 from thermal and/or electrical conditions in the wall 22. For example, seal 50 may include material having a low thermal conductivity to minimize the thermal energy transmitted through the seal. Similarly, selecting a material for seal 50 having high electrical resistance will inhibit the transmission of electrical energy. In a similar fashion, insert 40, bushing 70, actuator 80 and/or support member 31 may be formed from thermal or electrical isolating material to prevent transfer of thermal or electrical energy from the wall 22 through the support member 31 to the insert 40.

In use, the connector assembly 10 is inserted into the opening 24 in the fluid chamber 20 and the actuator 80 is tightened by rotating the actuator 80. Rotation of the actuator 80 causes the insert 40 to move axially such that the seal 50 is compressed between the first and second compression members. The seal 50 radially expands when it is compressed. This radial expansion of the seal 50 creates a generally fluid-tight seal between the inside edge 26 of opening 24 and outer surface 45 of the insert 40.

As illustrated the fluid-tight seal provided effectively isolates fluid contained in the fluid chamber 20 from contact with exterior surfaces of the chamber. Moreover, no voids or crevices are created within the chamber which would give rise to stagnant areas. The absence of voids and crevices makes it possible to undertake clean-in-place (CIP) practices to ensure hygienic operating conditions. In addition, if the pressure within the chamber increases, the increased pressure will further compress the seal 50, which enhances the fluid-tight seal.

The connector assembly 10 of the present invention provides a device that permits access to the interior of a fluid chamber 20. The fluid chamber 20 may assume various forms, such as a pipe or vessel, and typically contains fluid being transported and/or undergoing some type of process. The fluid chamber 20 may be a closed system which totally isolates the fluid from the external environment, or the fluid chamber 20 could be an open vat or channel for directing the flow of a fluid. In order to measure certain conditions within the fluid chamber 20, the connector assembly 10 permits access through the wall of a fluid chamber 20. For example, the insert 40 may comprise a measurement probe for monitoring conditions inside the fluid chamber, or a thermowell. In some cases, control and assessment of processes being carried out within the fluid chamber 20 may require bleeding or siphoning material from the fluid chamber 20 or injecting material into the fluid chamber 20. In this case, the insert 40 may comprise a sleeve with a fluid passage, therein allowing material to be introduced into or removed from the fluid chamber. The present invention can also be used to make a fluid connection between the fluid chamber 20 and a fluid conduit.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A hygienic insert connector assembly, comprising:
    an insert adapted to project through an opening in the side wall of a fluid chamber such that a first portion of the insert lies within the fluid chamber;
    a seal having first and second ends and an axial opening for said insert, said seal being disposed around the insert for sealing a space between the insert and the wall of the opening in the chamber, wherein the length of said seal is greater than the length of said opening such that said first end of the seal extends beyond the opening into the fluid chamber;
    first and second cooperative compression members disposed on opposite ends of the seal for axially compressing and radially expanding the seal such that a generally hygienic fluid-tight seal without voids and crevices is formed between the wall of the opening and the insert; wherein the first compression member is integrally formed with said insert and is movable along a movement axis with respect to the second compression member to compress the seal, and
    a first seal contact surface on said first end of said seal, said seal contact surface being disposed perpendicular to said movement axis and engaged by said first seal compression member such that the compression forces generated by axial compression of the seal are perpendicular to the first seal contact surface.

2. The hygienic insert connector assembly of claim 1 including an actuator to move the first compression member relative to the second compression member to compress and radially expand the seal.

3. The hygienic insert connector assembly of claim 2 wherein the second compression member is stationary.

4. The hygienic insert connector assembly of claim 3 wherein the first compression member comprises a flange integrally formed on the insert.

5. The hygienic insert connector assembly of claim 1 wherein the actuator moves the insert axially relative to the second compression member.

6. The hygienic insert connector assembly of claim 5 including a support member adapted to be fixedly secured to the chamber.

7. The hygienic insert connector assembly of claim 6 wherein the second compression member is integrally formed with the support member.

8. The hygienic insert connector assembly of claim 6 wherein the support member is integrally formed with the fluid chamber.

9. The hygienic insert connector assembly of claim 6 wherein the second compression member comprises a bushing disposed between the actuator and the support member.

10. The hygienic insert connector assembly of claim 9 wherein the bushing threadably engages the support member.

11. The hygienic insert connector assembly of claim 2 wherein the actuator comprises a threaded member threaded onto the insert.

12. The hygienic insert connector assembly of claim 11 wherein the connector assembly is configured to limit the axial movement of the insert.

13. The hygienic insert connector assembly of claim 1 wherein the connector assembly is adapted to provide thermal and/or electrical isolation of the insert.

14. The hygienic insert connector assembly of claim 6 wherein pressure within the chamber acts upon the first compression member to further compress the seal against the second compression member to enhance the fluid-tight seal.

15. The hygienic insert connector assembly of claim 6 wherein the first and second compression members interact to prevent the insert from being ejected from the chamber due to excess pressure within the chamber.

16. The hygienic insert connector assembly of claim 6 wherein the first compression member applies compression force to the first seal contact surface without sliding during compression.

17. The hygienic insert connector assembly of claim 16 whereby when the seal is compressed, the first compression member, the circumferential surface of the seal inside the chamber and the inside wall of the chamber adjacent to the opening collectively form a continuous hygienic surface without voids or crevices.

18. The hygienic insert connector assembly of claim 1 wherein the insert comprises a sensor.

19. The hygienic insert connector of claim of claim 1 wherein the insert comprises one of a thermowell or a conduit.

20. A hygienic insert connector assembly, comprising:
    a support member adapted to be fixedly secured to the fluid chamber;
    an insert adapted to project through an opening in the side wall of a fluid chamber such that a first portion of the insert lies within the fluid chamber;
    a seal having first and second ends and an axial opening for said insert, said seal being disposed around the insert for sealing a space between the insert and the wall of the opening in the chamber, said first end of the seal extending beyond the opening into the fluid chamber;
    a first movable compression member integrally formed with said insert;
    a bushing threadably engaged with said support member forming a second stationary compression member an actuator for moving said insert along a movement axis to compress said seal between said first and second compression members and to radially expand said seal;

a first seal contact surface on said first end of said seal, said seal contact surface being disposed perpendicular to said movement axis and engaged by said first seal compression member such that the compression forces generated by axial compression of the seal are perpendicular to the first seal contact surface.

* * * * *

UNITED STATES PATENT AND TRADEMARK OFFICE
CERTIFICATE OF CORRECTION

PATENT NO. : 7,607,364 B2   Page 1 of 1
APPLICATION NO. : 11/538117
DATED : October 27, 2009
INVENTOR(S) : Duff It is certified that error appears in the above-identified patent and that said Letters Patent is hereby corrected as shown below:

Fig. 5 should be deleted and replaced with the following figure:

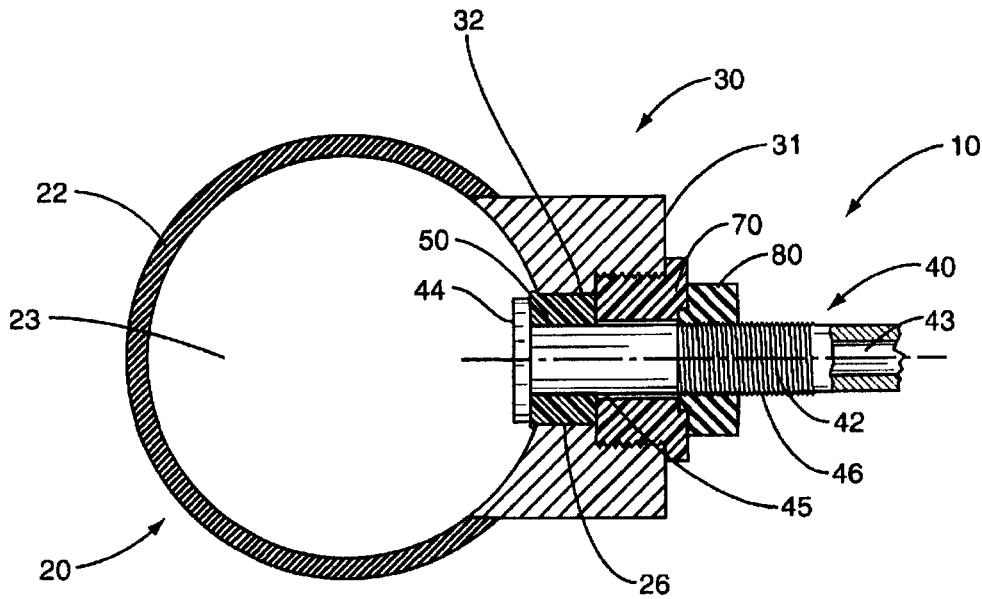

FIG. 5

Col. 1, line 47; Col. 2, lines 14, 24, 33 and 35; Col. 3, lines 3, 44, 45 and 47; and Col. 4, lines 37 and 63, for each occurrence the word "edge" should be changed to "wall."

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,607,364 B2                                      Page 1 of 1
APPLICATION NO. : 11/538117
DATED : October 27, 2009
INVENTOR(S) : Alan John Duff It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 273 days.

Signed and Sealed this

Twelfth Day of October, 2010

David J. Kappos
*Director of the United States Patent and Trademark Office*